Patented Jan. 5, 1932

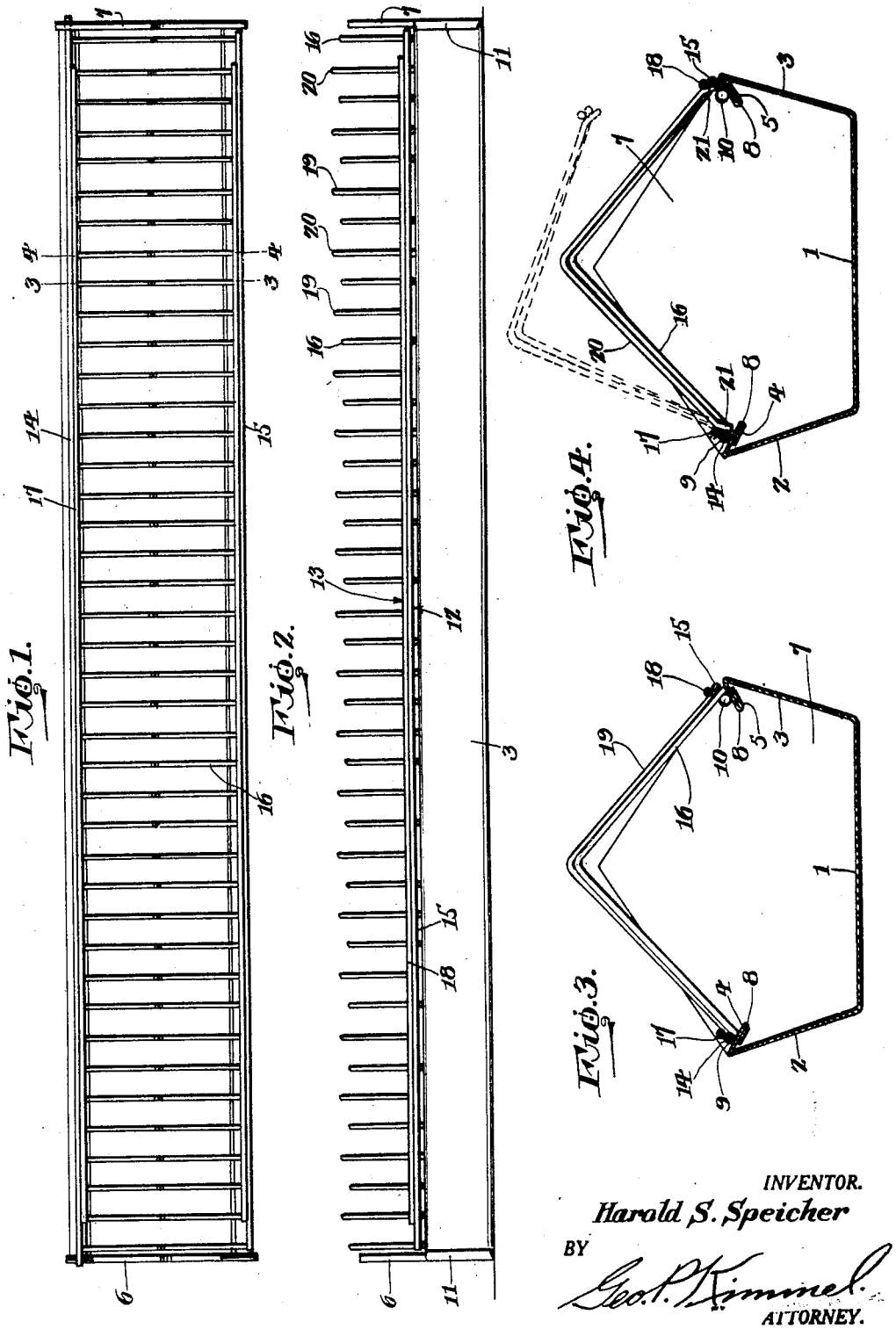

1,840,264

UNITED STATES PATENT OFFICE

HAROLD S. SPEICHER, OF URBANA, INDIANA

POULTRY FEED TROUGH

Application filed November 21, 1930. Serial No. 497,267.

This invention relates to a poultry feed trough of the hinged grid type and which is designed primarily for use for the feeding of chicks, but it is to be understood that a trough in accordance with this invention may be employed for any purpose for which it may be found applicable, and the invention has for its object to provide, in a manner as hereinafter set forth, a trough of the class referred to including a two-part grid, one part being adjustable lengthwise relative to the other for varying the width of the feed openings.

A further object of the invention is to provide, in a manner as hereinafter set forth, a poultry feed trough including a two-part hinged grid, one part being adjustable lengthwise relative to the other for varying the width of the feed openings and with one part including means coacting with the other part for detachably securing the adjusted part in its set position.

Further objects of the invention are to provide, in a manner as hereinafter set forth, a poultry feed trough of the hinged grid type which is simple in its construction and arrangement, strong, durable, compact, thoroughly efficient in its use, readily assembled, and comparatively inexpensive to manufacture.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a top plan view of a poultry feed trough in accordance with this invention.

Figure 2 is a side elevation thereof illustrating one of the parts of the grid adjusted relative to the other.

Figure 3 is a section on line 3—3 Figure 1.

Figure 4 is a section on line 4—4 Figure 1 and further illustrating in dotted lines the grid elevated.

The trough includes a body or container part of the desired length and width and which consists of a bottom 1, a pair of oppositely disposed side walls 2, 3 inclining outwardly from their lower ends to their tops and having their tops formed with inwardly extending downwardly inclining lengthwise disposed flanges 4, 5 respectively, and a pair of end walls 6, 7 of pentagonal form and which are of greater height than the side walls.

The body or container part is preferably formed from a single length of sheet metal of the desired gauge and in a manner to provide for the ends of the side walls abutting the inner faces of the end walls. The ends of the side walls are preferably secured to the inner faces of the end walls. The length of the flanges 4, 5 are the same as the length of the side walls and each flange is bent upon itself to provide a rounded inner edge 8. Each end wall in proximity to the upper face of an end of each flange is provided with an opening. The openings in each end wall are designated at 9, 10. Each end wall at its lower part is formed with an inwardly extending right angularly disposed flange 11 of the same height as the height of the side walls. The flanges 11 oppose and are secured to the outer faces of the side walls.

Arranged between and hinged to the end walls is a grid formed of an inner part or member and an outer part or member generally indicated at 12, 13 respectively. The member 13 is arranged in superposed relation with respect to the member 12. The member 13 is capable of sliding upon the member 12 lengthwise of the latter. Each grid member is of inverted V-shape.

The grid member 12 includes a pair of side bars 14, 15 arranged in parallel spaced relation and with the bar 14 of greater length than the bar 15, and a series of spaced inverted V-shaped bars 16. The bar 14 is secured against the outer face at the lower ends of the bars 16 and the bar 15 is secured to the outer face at the other lower end of the bars 16. The opening 9 in one end wall aligns with the opening 9 in the other end wall and the ends of the bar 14 are mounted in said aligning openings whereby the grid is hinged to the body or container part of the trough. The opening 10 in one end wall aligns with the opening 10 in the other end wall and the ends of the bar 14 can be mounted in such aligning openings whereby the grid is hinged to the body or container part of the trough. The arrangement is such that the grid can be selectively hinged to the end walls at either side of the trough.

The member 13 is of less length than the length of member 12 and consists of a pair of side bars 17, 18 disposed in parallel spaced relation and of the same length, a set of inverted V-shaped bars 19 and a set of inverted V-shaped bars 20. The inverted V-shaped bars of the member 13 are arranged in spaced relation. Each of the bars of the set 20 has each lower end terminal portion 21 thereof disposed at an angle with respect to the remaining portions of the bar. The side bars 17, 18 are secured to the lower ends of the outer faces of the bars of the set 19 and to the outer faces of the bars of the set 20 at the top of the angular terminal portions 21 of the said bars 20.

When the grid is set up the bars 17, 18 seat upon the bars 14, 15 respectively. The angular terminal portions 21 provide resilient latches coacting with the bars 14, 15 for detachably securing the member 13 in set position, and when in latching position the said terminal portions are snapped against the inner sides of the bars 14, 15 and retain the member 13 in the desired position.

The adjusting of the member 13 relative to the member 12 provides for varying the width of the feed openings. When the members 12 and 13 are detachably connected together the two parts of the grid are bodily movable together when the grid is shifted upon its hinge. When the grid is in lowered position it seats on the flanges 4, 5. The grid is of a height to project above the end walls and when set up relative to the body or container part the apex thereof is disposed slightly off center with respect to the center of the end walls.

What I claim is:

1. A grid for positioning over the top of a feed container comprising an upper and a lower part arranged in superimposed relation to provide feed openings, one of said parts being shiftable relative to the other for varying the size of the feed openings, and said parts having inherent coacting means for maintaining the shiftable part in shifted position.

2. A grid for positioning over the top of a feed container comprising an upper and a lower part arranged in superimposed relation to provide feed openings, one of said parts being shiftable relative to the other for varying the size of the feed openings, and said parts having at their lower portions spaced inherent coacting means for maintaining the shiftable part in set position.

3. A grid for positioning over the top of a feed container comprising an upper and a lower part arranged in superimposed relation to provide feed openings, one of said parts being shiftable relative to the other for varying the size of the feed openings, and said shiftable part having spaced depending means coacting with the lower portion of said other part for maintaining the shiftable part in set position.

4. A grid for positioning over the top of a feed container comprising an upper and a lower part arranged in superimposed relation to provide feed openings, one of said parts being shiftable relative to the other for varying the size of the feed openings, and said shiftable part having depending means for frictional engagement with the lower portion of the other part for maintaining the shiftable part in set position.

In testimony whereof, I affix my signature hereto.

HAROLD S. SPEICHER.